United States Patent
Ellgardt et al.

(10) Patent No.: US 12,155,404 B2
(45) Date of Patent: Nov. 26, 2024

(54) NETWORK DEVICE AND METHOD THEREIN FOR HANDLING PASSIVE INTERMODULATION SIGNALS IN A WIRELESS COMMUNICATIONS NETWORK

(71) Applicant: Telefonaktiebolaget LM Ericsson (publ), Stockholm (SE)

(72) Inventors: Jin Ellgardt, Sundbyberg (SE); Jim Svensson, Solna (SE); Spendim Dalipi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 193 days.

(21) Appl. No.: 17/600,532

(22) PCT Filed: Apr. 1, 2019

(86) PCT No.: PCT/SE2019/050296
§ 371 (c)(1),
(2) Date: Sep. 30, 2021

(87) PCT Pub. No.: WO2020/204772
PCT Pub. Date: Oct. 8, 2020

(65) Prior Publication Data
US 2022/0182087 A1 Jun. 9, 2022

(51) Int. Cl.
*H04B 1/10* (2006.01)
*H04B 1/12* (2006.01)

(52) U.S. Cl.
CPC .......... *H04B 1/109* (2013.01); *H04B 1/1036* (2013.01); *H04B 1/123* (2013.01)

(58) Field of Classification Search
CPC ....... H04B 1/109; H04B 1/1036; H04B 1/123
See application file for complete search history.

(56) References Cited

U.S. PATENT DOCUMENTS 8,521,117 B1 * 8/2013 Gupta ...................... H04B 1/10
455/296
8,855,175 B2 * 10/2014 Wyville ................. H04B 1/109
375/220

(Continued)

FOREIGN PATENT DOCUMENTS

WO 2012161632 A1 11/2012

OTHER PUBLICATIONS

Amin, Najam Muhammad, et al., "Transmit and Receive Crosstalk Cancellation," International Conference on Emerging Tehcnologies (ICET), IEEE, 2010, pp. 210-215.

(Continued)

*Primary Examiner* — Jinsong Hu
*Assistant Examiner* — Rui M Hu
(74) *Attorney, Agent, or Firm* — Withrow & Terranova, PLLC

(57) ABSTRACT

Systems and methods for handling cancellation of a Passive Intermodulation (PIM) signal are provided. The network device has access to and controls one or more transmitters and one or more receivers. The network device applies a determined PIM model to a transmitted signal from each transmitter of the network device, to obtain a modelled signal. The PIM model comprises a forward path model for each transmitter to the PIM source, a common non-linear model of the PIM signal from the PIM source being applied to a combined signal comprising the signals from each transmitter modelled by the forward path model, and a linear reflective path model from the PIM source to each of the receivers of the network device for a received PIM signal. The network device further subtracts the modelled signal from a received signal on each of the receivers of the network device.

12 Claims, 17 Drawing Sheets

(56) References Cited

U.S. PATENT DOCUMENTS

| | | | | |
|---|---|---|---|---|
| 9,344,122 | B1* | 5/2016 | Haddadin | H03F 3/189 |
| 9,548,775 | B2* | 1/2017 | Smith | H04B 1/109 |
| 9,768,812 | B1* | 9/2017 | Tsui | H04B 17/0085 |
| 2012/0295558 | A1* | 11/2012 | Wang | H04B 1/123 |
| | | | | 455/79 |
| 2013/0044791 | A1* | 2/2013 | Rimini | H04B 1/525 |
| | | | | 375/219 |
| 2014/0036736 | A1* | 2/2014 | Wyville | H04B 1/525 |
| | | | | 370/278 |
| 2014/0036969 | A1* | 2/2014 | Wyville | H04B 1/38 |
| | | | | 375/219 |
| 2014/0269857 | A1* | 9/2014 | Rimini | H04B 1/1036 |
| | | | | 375/285 |
| 2014/0334349 | A1* | 11/2014 | Mao | H04L 5/1461 |
| | | | | 370/278 |
| 2015/0171902 | A1* | 6/2015 | Fleischer | H04B 17/19 |
| | | | | 375/285 |
| 2015/0244414 | A1* | 8/2015 | Yu | H04B 1/109 |
| | | | | 455/73 |
| 2015/0358047 | A1* | 12/2015 | Sarrigeorgidis | H04B 1/525 |
| | | | | 455/78 |
| 2016/0352411 | A1* | 12/2016 | Lange | H04B 7/15585 |
| 2016/0366605 | A1* | 12/2016 | Tsui | H04W 24/08 |
| 2017/0141807 | A1* | 5/2017 | Chen | H04B 1/123 |
| 2017/0141938 | A1* | 5/2017 | Chen | H04B 1/12 |
| 2017/0201277 | A1* | 7/2017 | Wang | H04B 1/109 |
| 2019/0253098 | A1* | 8/2019 | Lv | H04B 1/1018 |
| 2019/0363750 | A1* | 11/2019 | Lai | H04B 1/109 |
| 2020/0252094 | A1* | 8/2020 | Wang | H04B 1/123 |
| 2022/0015115 | A1* | 1/2022 | Österling | H04W 72/542 |
| 2022/0321163 | A1* | 10/2022 | Avraham | H04B 1/525 |
| 2022/0376736 | A1* | 11/2022 | Gopalan | H04B 1/109 |

OTHER PUBLICATIONS

International Search Report and Written Opinion for International Patent Application No. PCT/SE2019/050296, mailed Jan. 10, 2020, 8 pages.

* cited by examiner

NETWORK DEVICE AND METHOD THEREIN FOR HANDLING PASSIVE INTERMODULATION SIGNALS IN A WIRELESS COMMUNICATIONS NETWORK

This application is a 35 U.S.C. § 371 national phase filing of International Application No. PCT/SE2019/050296, filed Apr. 1, 2019, the disclosure of which is incorporated herein by reference in its entirety.

BACKGROUND

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO. Each antenna may herein be referred to as a branch.

Passive Intermodulation (PIM) is a large site problem which exists in a lot of sites operating in certain bands. PIM is caused by a generation of interfering signals due to nonlinearities in mechanical components of a wireless system. Two or more signals may mix together and cause intermodulation products that may fall within one or more receiver bands of the network device, which may degrade the sensitivity of the receiver.

An interaction of mechanical components generally causes the nonlinearities in the mechanical components, especially anywhere that two different metals come together. PIM may occur in antenna elements, coax connectors, coax cable, and grounds. It may be caused by rust, corrosion, loose connections, dirt, oxidation, contamination and/or any combination of these factors. Even nearby metal objects such as guy wires and anchors, roof flashings, and pipes may cause PIM.

The existence of PIM severely degrades the sensitivity of a receiver and thus the network performance. Cancellation of PIM has been studied and many techniques have been proposed. A digital PIM compensator at a receiver has e.g. been proposed. In this solution, the PIM compensator uses a digital input signal of a transmitter to generate an estimated PIM signal which is then subtracted by the digital output signal of the main receiver. It has however been shown that the complexity of this known model increases significantly when the number of transmitters or receivers are increased. In FIG. 1 below the PIM cancellation architecture is shown for a two transmitter (Tx) and two receiver (Rx) use case.

In commonly used architectures for PIM cancellation, a non-linear modelling may incorporate the transmitter and the receiver channel models and must be computed individually for each Tx and Rx combination. Typically polynomial modelling may be used. In the case of polynomial modelling, the complexity of the 3rd order non-linear modelling increases as $O(N^3)$ with regards to the number of transmitter signals involved. For example; if six polynomial terms are needed to model a 2Tx use case, for a 4Tx use case the number of terms will increase to 40. In a 4Tx/4Rx single band use case 40*4=160 polynomial terms have to be computed.

The known solutions are therefore very complex and require high processing power for determining the PIM cancellation signal when a large number of transmitters and/or receivers are used.

SUMMARY

The embodiments herein therefore aim to provide a solution for cancelling PIM signals which is less complex and reduces the processing power required for determining the cancellation signal.

According to a first aspect of embodiments herein, the object is achieved by a method performed by a network device, for handling cancellation of a Passive Intermodulation (PIM) signal from a PIM source in a wireless communications network. The network device has access to and controls one or more transmitter (Tx) and one or more receiver (Rx). The network device applies, for each of the one or more Rx's of the network device, a determined PIM model to a transmitted signal from each of the one or more Tx's of the network device, to obtain a modelled signal. The PIM model comprises a linear forward path model for each of the one or more Tx's to the PIM source, a common non-linear model of the PIM source being applied to the signals from each of the one or more Tx's modelled by the linear forward path model, and a linear reflective path model from the PIM source to each of the one or more Rx's of the network device for a received PIM signal. The network device further subtracts the modelled signal from a received signal on each of the one or more Rx's of the network device.

According to a second aspect of embodiments herein, the object is achieved by a network device, for handling cancellation of a PIM signal from a PIM source in the wireless communications network. The network device has access to and controls one or more Tx and one or more Rx. The network device is configured to apply, for each of the one or more Rx's of the network device, the determined PIM model to a transmitted signal from each of the one or more Tx's of the network device, to obtain a modelled signal. The PIM model comprises the linear forward path model for each of the one or more Tx's to the PIM source, the common non-linear model of the PIM source being applied to the signals from each of the one or more Tx's modelled by the linear forward path model, and the linear reflective path model from the PIM source to each of the one or more Rx's of the network device for the received PIM signal. The network device is further configured to subtract the modelled signal from a received signal on each of the one or more Rx's of the network device.

It is furthermore provided herein a computer program comprising instructions, which, when executed on at least one processor, cause the at least one processor to carry out any of the method for handling cancellation of the PIM signal from the PIM source in the wireless communications network, as performed by the network device. It is additionally provided herein a computer-readable storage medium, having stored thereon a computer program comprising instructions which, when executed on at least one processor, cause the at least one processor to carry out the method for handling cancellation of the PIM signal from the PIM source in the wireless communications network, as performed by the network device As a consequence, the non-linear modeling itself can also be reduced in complexity since the Tx signals are combined prior to the input of the non-linear modeling, resulting in much fewer needed non-linear terms describing the PIM source.

BRIEF DESCRIPTION OF DRAWINGS

The embodiments herein will now be described and explained in more detail in relation to the enclosed drawings, in which.

DETAILED DESCRIPTION

The embodiments herein propose a complexity-reduced approach for handling cancellation of PIM signals, wherein the PIM model is separated into three parts; a linear forward path channel-model, a non-linear PIM source model and a reflective-path channel model for each receiver. The non-linear PIM source modeling is common to all receiver branches and thus the complexity is reduced by approximately 1/(number of branches) compared to the known solutions.

Figure 1:
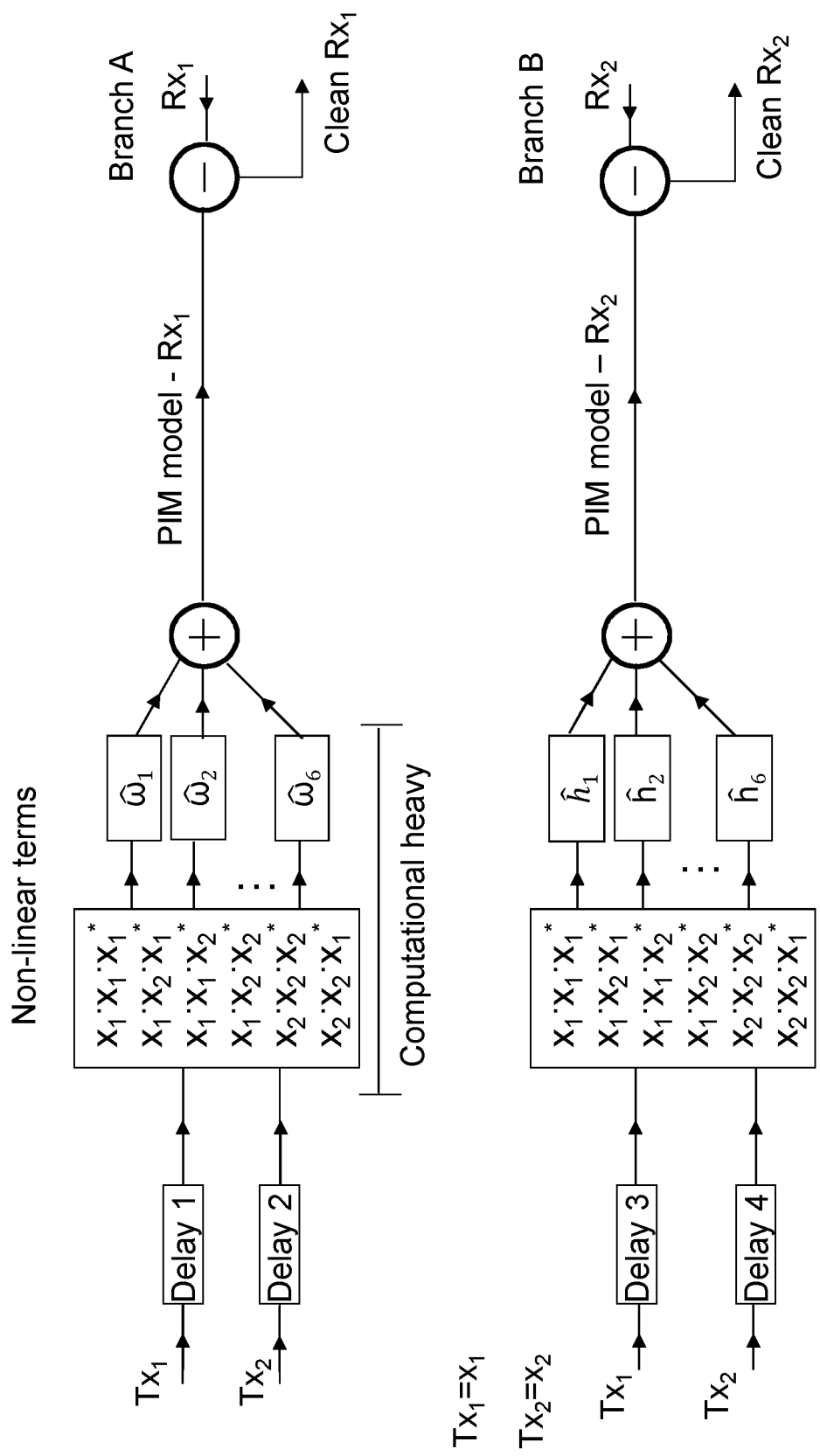
FIG. 1 is a schematic overview depicting a known architecture for handling PIM cancellation.

FIG. 1 shows a known PIM-Cancellation architecture for a 2Tx and 2Rx radio use case. The architecture shown in FIG. 1 is a commonly used architecture in PIM cancellation techniques. A non-linear modelling incorporates the transmitter and the receiver channel models and must be computed individually for each Tx and UL combination. In the case of polynomial modelling as in FIG. 1, the complexity of the 3rd order non-linear modelling increases as $O(N^3)$ with regards to the number of transmitter signals involved. For example; if six polynomial terms are needed to model a 2Tx use case, for a 4Tx use case the number of terms will increase to 40. In a 4Tx/4Rx single band use case 40*4=160 polynomial terms have to be computed. A filter $\hat{\omega}_n$ or $\hat{h}_n$ may further be applied to each of the polynomial terms generated by the model.

Figure 2:
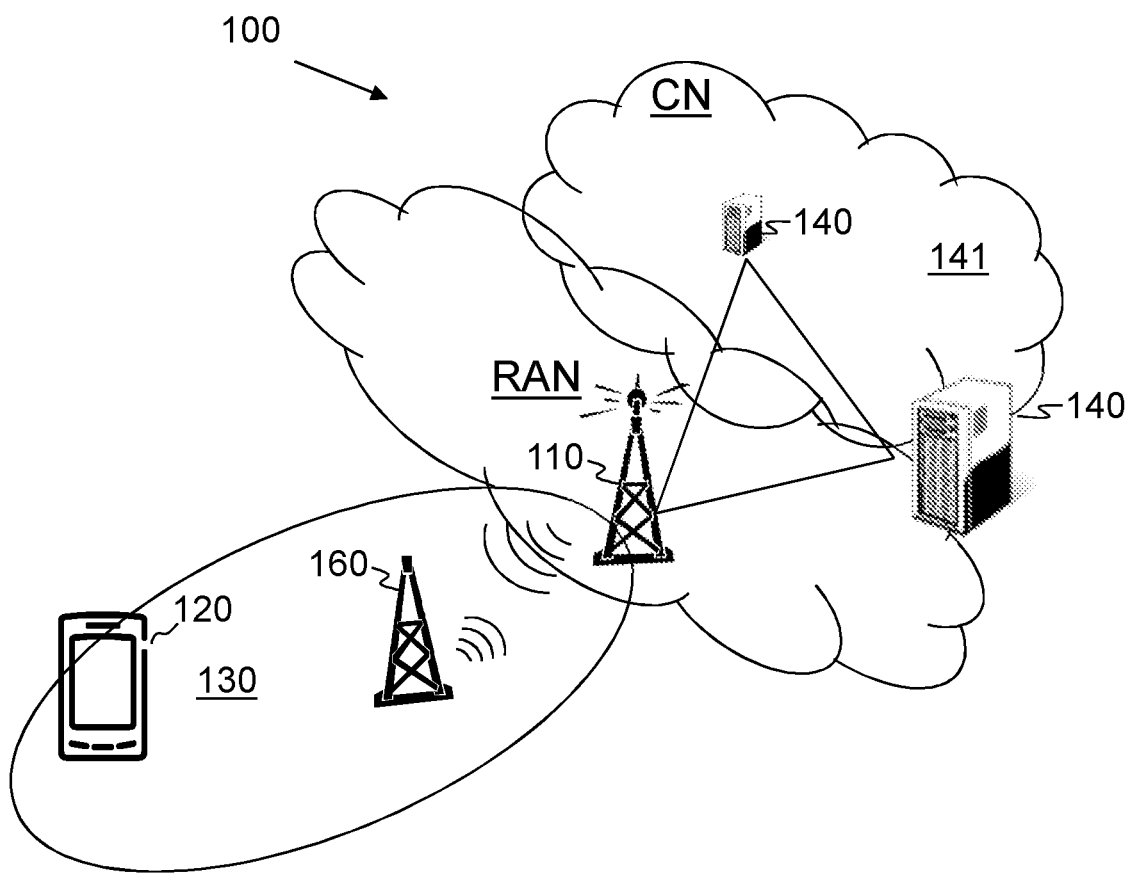
FIG. 2 is a schematic overview depicting a wireless communications network.

FIG. 2 is a schematic overview depicting a wireless communications network 100. The wireless communications network 100 comprises one or more RANs and one or more CNs. The wireless communications network 100 may use a number of different technologies, such as Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. one or more UEs 120 also referred to as device, such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises one or more radio network nodes 110 providing radio coverage over a geographical area, a service area 130, which may also be referred to as a beam or a beam group of a first radio access technology (RAT), such as 5G, LTE, Wi-Fi or similar. The radio network node 110 may be a NG-RAN node, transmission and reception point e.g. a base station, a radio access network node such as a Wireless Local Area Network (VVLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 150 may be referred to as a serving radio network node and communicates with the UE 120 with Downlink (DL) transmissions sent by the Tx to the UE 120 and Uplink (UL) transmissions received from the UE 120 on the Rx.

The radio network node 110 and the UE 120, or any other devices in the wireless communications network comprising a transceiver may herein be referred to as network devices. An interaction of mechanical components of the network device 110 may cause nonlinearities in the mechanical components of the network device 110, especially anywhere that two different metals come together. Thereby PIM may occur in antenna elements, coax connectors, coax cable, and grounds. It may be caused by rust, corrosion, loose connections, dirt, oxidation, contamination and/or any combination of these factors. PIM may also be caused by structures 160 located in the vicinity of the network device 110. The structure 160 may e.g. be a metal object such as e.g. guy wires and anchors, roof flashings, and/or pipes.

Figure 3:
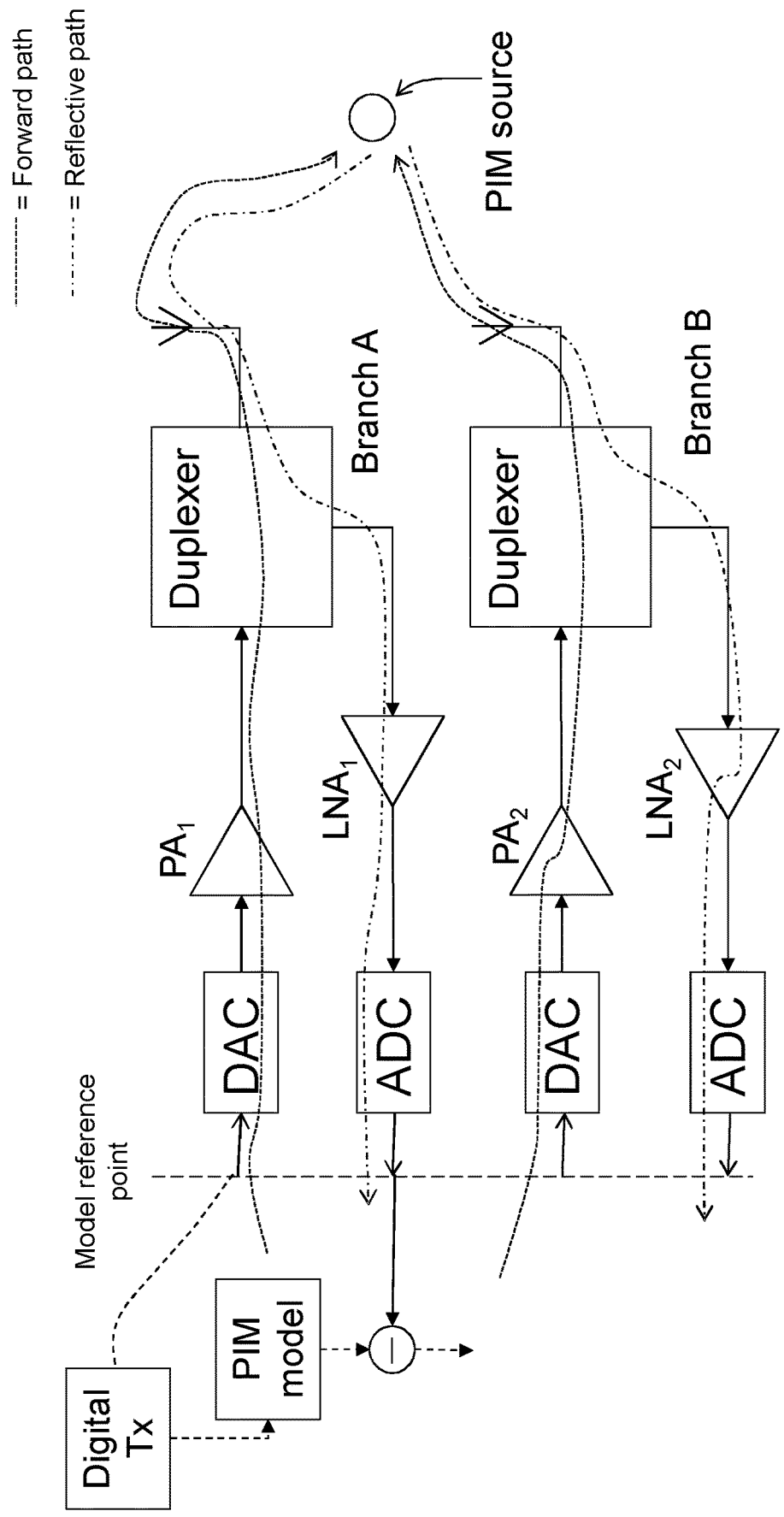
FIG. 3 is a schematic overview depicting a scenario in which a PIM signal occurs.

FIG. 3 shows a PIM source being illuminated by two signals Tx1 and Tx2 transmitted by a first and a second Tx of the network device 110. The intermodulation product from the PIM source is reflected back to the receivers of the network device 110. In the following the term forward path shall be interpreted as the path from the model reference point shown in FIG. 3 through the transmitter of the network device 110 to the PIM source. The term reflective path shall herein be interpreted as the path propagating back from the PIM source through the receiver of the network device 110 to the model reference point. When a signal is transmitted on one of the branches A or B the digital signal is converted from a digital signal to an analog signal by means of a Digital to Analog Converter (DAC). The converted signal is then sent through a Power Amplifier (PA) before it passes through a Duplexer for allowing sending and receiving on the same antenna. When the signal is received the Duplexer is switched to receiving over the antenna and a signal, such as the PIM signal, can be received by the antenna. The received analog signal is fed through a Low Noise Amplifier (LNA) before it is converted back to a digital signal by means of an Analog to Digital Converter (ADC).

Figure 4:
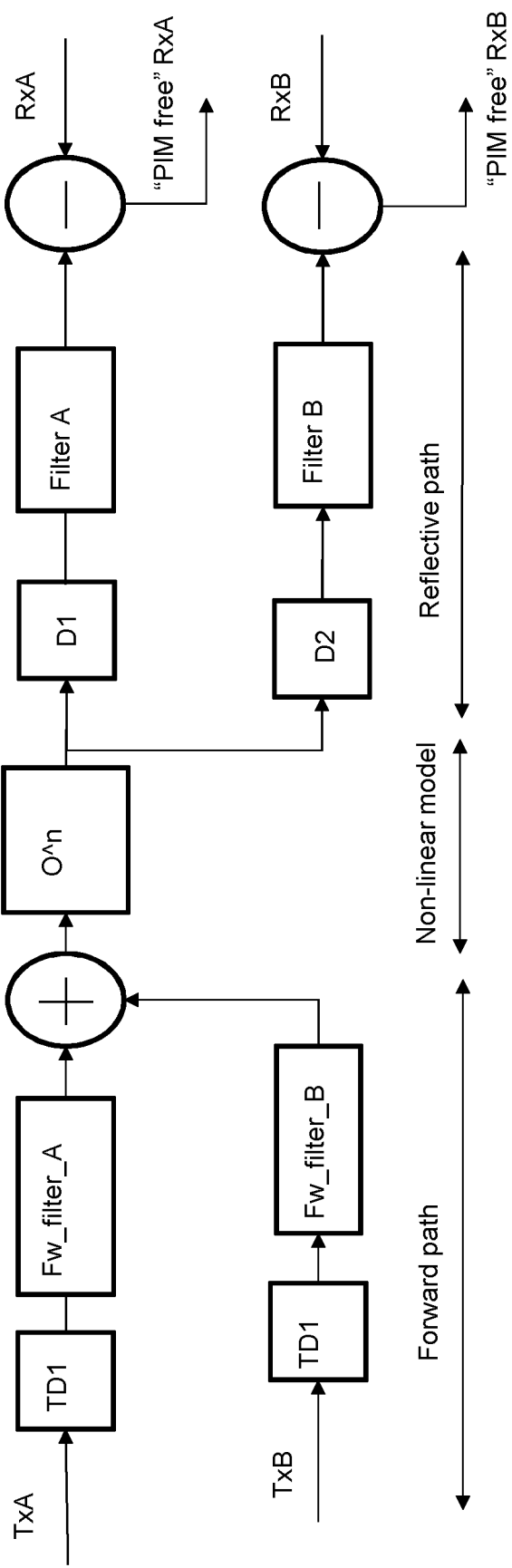
FIG. 4 is a schematic overview depicting a PIM cancellation architecture according to embodiments herein.

FIG. 4 shows a de-coupled PIM-Cancellation architecture according to the embodiments herein in a use case where the network device 110, 120 comprises two transceivers, i.e. two transmitters and two receivers, which may also be referred to as having two transceiver branches. The PIM-model comprises a linear forward channel path model, a common non-linear model of the PIM source and a linear reflective path channel model. In the embodiments herein the computation heavy non-linear model O^n is re-used between the branches, in other words the same determined non-linear model is used for modelling all of the branches of the network device 110, 120. Although the branches in FIG. 4 are shown as transceiver branches, in some embodiments herein the network device 110, 120 may also comprise dedicated transmitter and/or receiver branches, i.e. antennas which are only configured to send or transmit.

Although the PIM-Cancellation architecture of FIG. 4 is shown for a 2Tx/2Rx use case it may easily be generalized to an nTx/mRx use case, i.e. a use case where the network device has n transmitter and m receiver. The re-usable non-linear PIM source model may be modelled using General Memory Polynomials, Look-up tables or other non-linear modelling structures known to a person skilled in the art.

Figure 5:
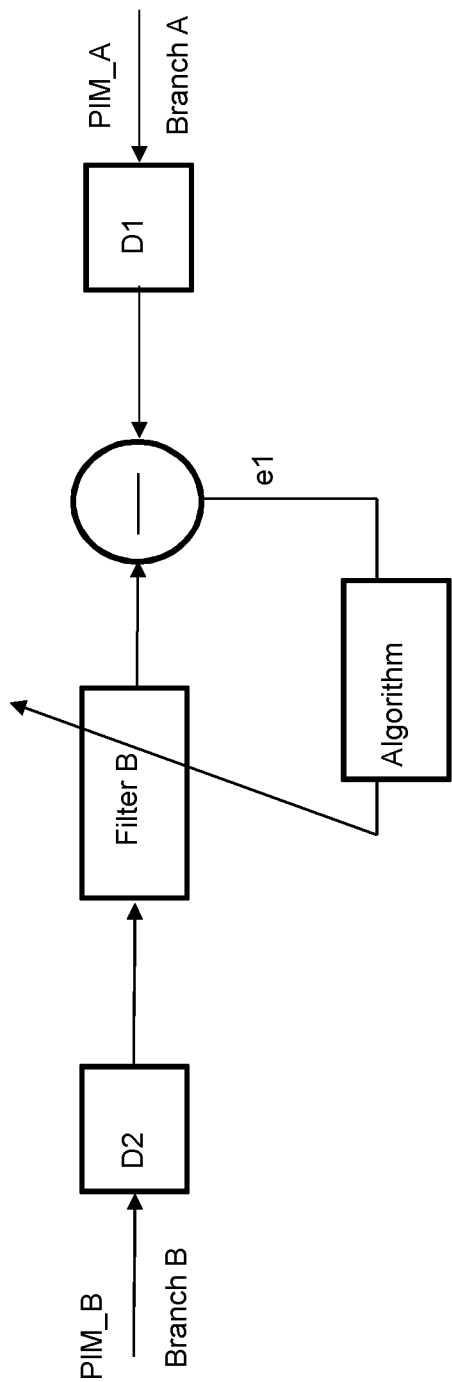
FIG. 5 is a schematic overview depicting an architecture for determining a linear reflective path model of the PIM cancellation architecture according to embodiments herein.

FIG. 5 shows an exemplary method for finding the reflective channel path for the one or more receivers comprised in the network device according to embodiments herein. The PIM source is common to all receivers but has different paths to the digital reference point of each receiver. The digital reference point is a reference point in which the PIM model is generated in a digital domain. The PIM model may be injected in anti-phase to each receiver branch, thereby cancelling the PIM on the receivers. In the following, the identification of the linear reflective path is shown for two receivers, receiver A and receiver B, it may however be scaled to more than two receivers.

The network device receives the PIM signal on all receivers, in this case a first receiver A and a second receiver B. The PIM signal received on receiver A is herein referred to as PIM_A and the PIM signal received on receiver B is herein referred to as PIM_B. This corresponds to action 1111 described in relation to FIG. 11.

The network device sets one of the receiver branches, in this case branch A, as the reference branch. The channel properties of the linear reflective path on branch B, and all other branches, may be derived relative to branch A. This corresponds to action 1112 described in relation to FIG. 11.

The network device may estimate a relative time delay taut between the PIM sensed on branch A (PIM_A) and the PIM sensed on branch B (PIM_B) by performing a time delay estimation, e.g. through time delay correlation, of the two received signals. This will output a delay D1 at branch A which is D1=0, and a delay D2 at branch B which is D2=tau1. This is similar to the action 1113 described in relation to FIG. 11.

The network device may further apply a filter to the PIM_B received on branch B. The PIM_B is the PIM signal sensed on receiver branch B at the digital reference point and PIM_A is the PIM signal sensed on receiver A at the digital reference point. The PIM_B is filtered by means of a Filter_B as shown in FIG. 5 and an error e1 between the filtered PIM_B and the PIM_A may be determined. This is similar to the action 1113 described in relation to FIG. 11.

The network device may further adapt filter coefficients of the Filter_B according to the constraint that the error e1 is to be minimized. The error may e.g. be minimized by minimization of the absolute value of e1, abs(e1)^2. The coefficients may e.g. be a phase, a delay, and/or a gain of the linear reflective path model. This is similar to the action 1113 described in relation to FIG. 11.

Figure 6:
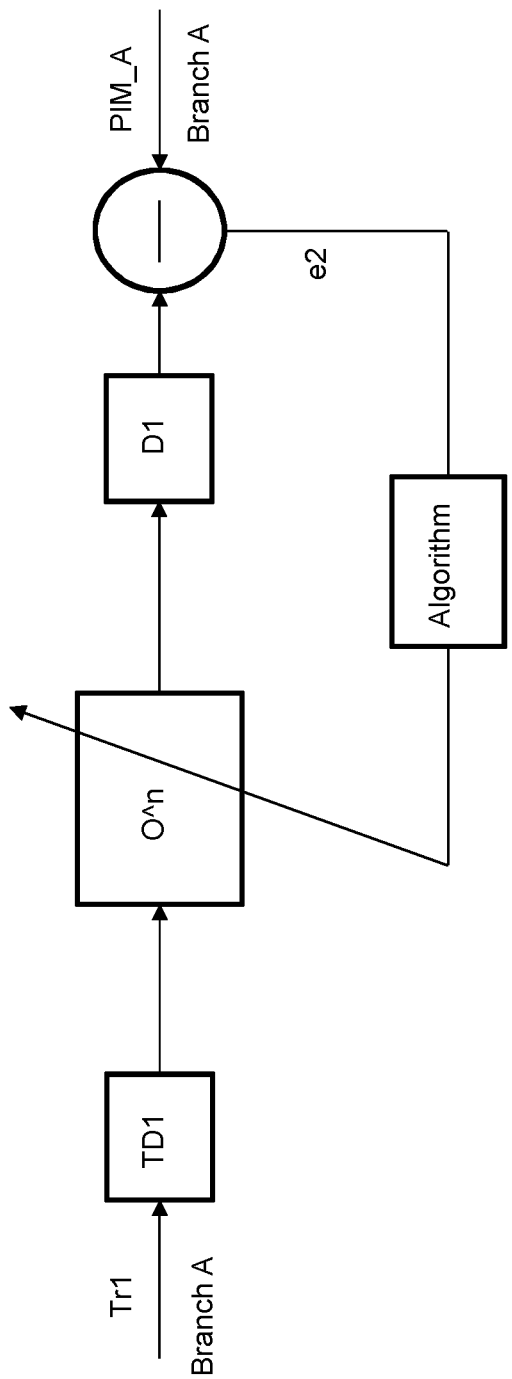
FIG. 6 is a schematic overview depicting an architecture for determining a non-linear model of the PIM cancellation architecture according to embodiments herein.

FIG. 6 shows a method for identifying the non-linear model O^n describing the system. The PIM source remains common to all transmitters but has different paths, from the digital reference point to the PIM source. Here the identification of the linear forward path is shown for the two transceiver branches A and B, but it may be scaled to more antenna branches.

The network device 110, 120 powers on the transmitter on Branch A, with a training signal Tr1. In other words the network device 110, 120 transmits the training signal on one of the one or more transmitters. The training signal may herein also be referred to as a reference signal. The other transmitters shall not have signals that are correlated with Tr1, i.e. the other transmitters do not transmit signals that are correlated with Tr1. The characteristics of the training signals may be chosen such that training signals resembles an adequate traffic use case when all transmitters of the network device are on. This corresponds to the action 1121 described in relation to FIG. 12.

The network device 110, 120 receives the PIM signal on branch A, which PIM signal is referred to as PIM_A, and estimates the time delay between PIM_A and Tr1 at the digital reference point. This will output the time delay TD1. The PIM signal received here is the PIM signal generated by the training signal Tr1 hits the PIM source. This corresponds to the action 1122 described in relation to FIG. 12.

The network device 110, 120 further estimates PIM_A through the non-linear modelling, O^n. The non-linear modelling can be made through, General Memory Polynomials, Look-up tables or other non-linear modelling structures known for persons skilled in the art. This is similar to the action 1124 described in relation to FIG. 12.

The network device 110, 120 adapts the non-linear model $\hat{O}n$ with the constraint that the error e2 is to be minimized, e.g. by minimizing the residue energy of the signal. This may e.g. be done by minimizing the absolute value of e2, $abs(e2)^2$. This is similar to the action 1124 described in relation to FIG. 12.

Figure 7:
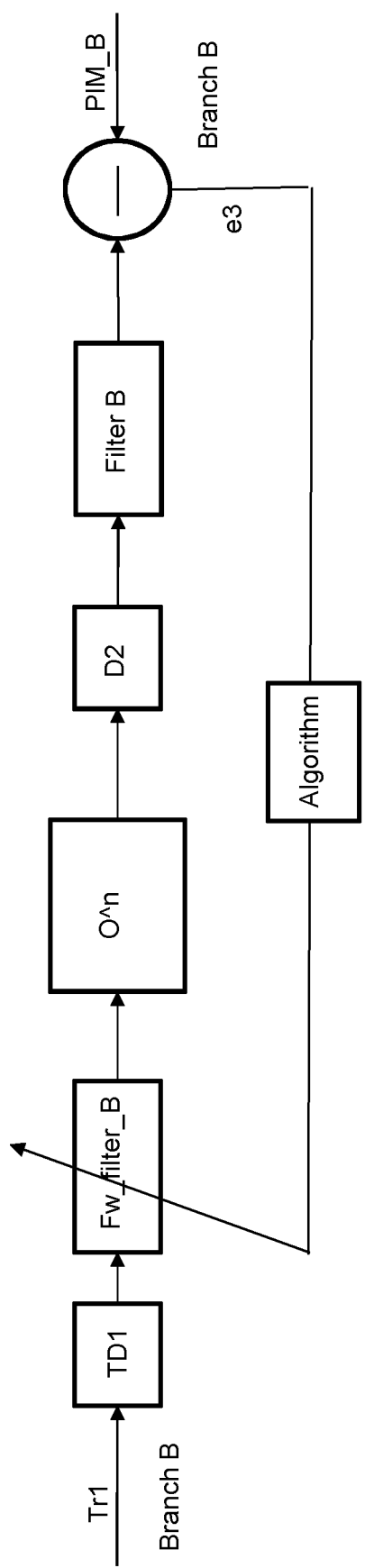
FIG. 7 is a schematic overview depicting an architecture for determining a linear forward path model of the PIM cancellation architecture according to a first embodiment herein.

FIG. 7 shows a method for finding the linear forward path for each branch handled by the network device 110, 120 using a deterministic approach. Identifying the filter FW_filter_B of the linear forward path of the digital reference point of branch B relative to linear forward path of branch A.

For finding the linear forward path from the digital reference point of branch B to the PIM source, relative to the digital reference point of branch A to the PIM source, previously derived estimations and models may be used in the structure: Filter_B, D2, $\hat{O}n$ and TD1. This corresponds to the action 1131 described in relation to FIG. 13.

The network device 110, 120 may apply the same training signal Tr1, on the transmitter of branch B. The other transmitters are muted and do not transmit signals that are correlated with Tr1.

The linear forward path of branch B's digital reference point to the PIM source relative to the linear forward path of branch A's digital reference point to PIM source can be found by adapting filter coefficients of a filter applied to the forward path, which filter is herein referred to as Fw_filter_B, with the constraint that the error e3 between the signal Tr1, after it has been modelled, and the received PIM signal on one of the receivers, in this case the receiver of branch B, is to be minimized. The minimization of the error e3 may e.g. be performed through minimization of the absolute value of e3, i.e. $abs(e3)^2$. This is similar to the action 1132 and 1133 described in relation to FIG. 13.

Figure 8:
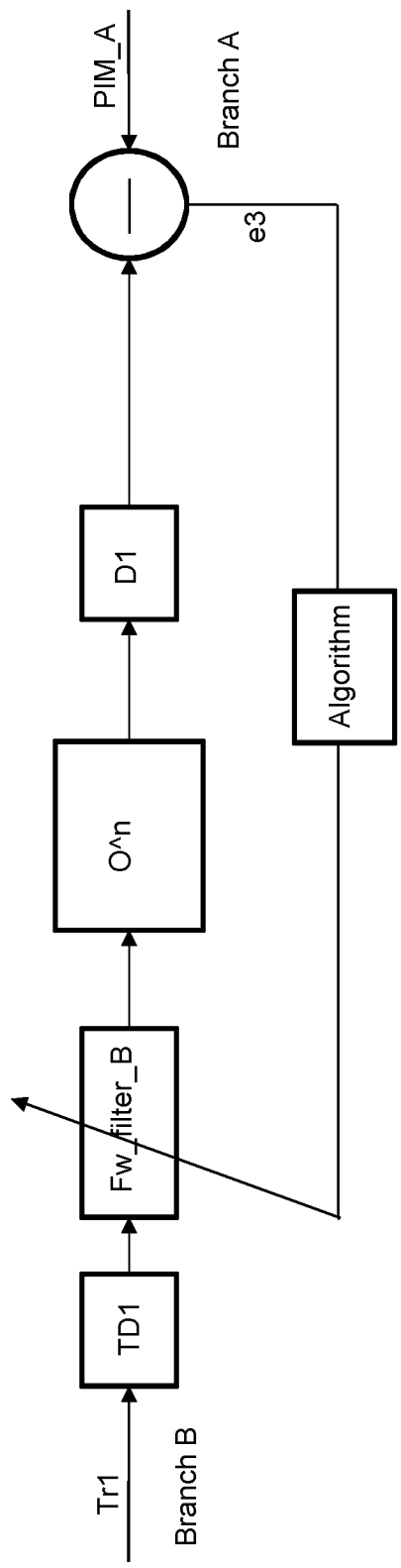
FIG. 8 is a schematic overview depicting an architecture for determining a linear forward path model of the PIM cancellation architecture according to a first embodiment herein.

The filter coefficients for the Fw_filter_B may be determined by using a receiver of another branch, such as e.g. of branch A, in which case the structure for finding the filter coefficients is configured as is shown in FIG. 8.

Estimation of the PIM Model

In the procedures described in relation to FIGS. 5 and 6, the linear reflective paths and the forward paths from the digital reference point to the PIM source have been identified, relative to a reference branch. The reflective and forward path models were derived relative to the reference branch A and are linear models of the propagation of the transmitter signal to the PIM source, and back to the receiver. The nonlinearity of the signal arises when the non-linear medium, which herein it referred to as the PIM source, is induced by the transmitters.

Since the linear model of the transmitters to the source, i.e. the forward path, is determined, the transmitter signals may be combined prior to the non-linear modelling of the signal in accordance with the full PIM cancellation structure shown in FIG. 4.

For sake of generality the filters FW_filter_A and Filter_A for branch A are also included in the structures. If branch A is the reference branch these filters may be set to 1 or other values that are better suited. The important aspect is that the FW_filter_B and Filter_B of branch B is derived relative to the values chosen for FW_filter_A and Filter_A.

Since the PIM source will exhibit other signal statistics than when only training signals are applied, the non-linear model $\hat{O}n$ may be tracked and the parameters thereof may be adapted according to the constraints used during training.

Figure 9:
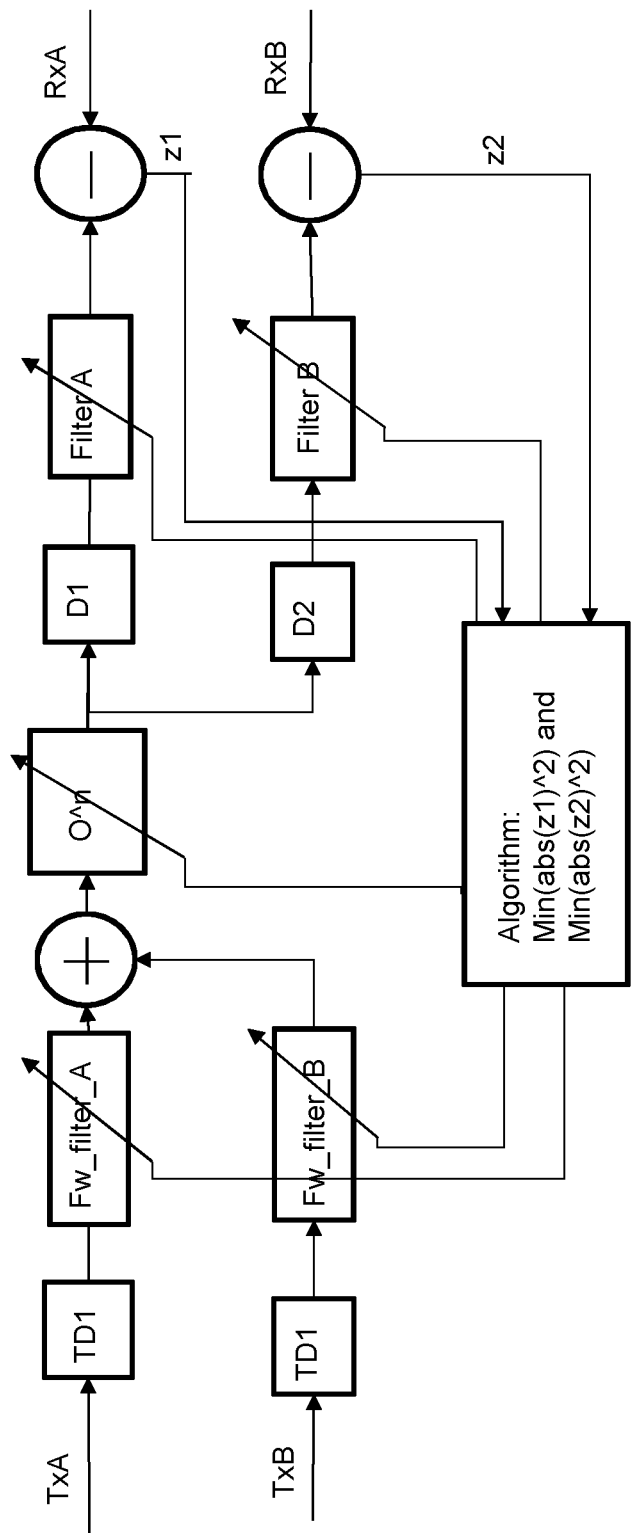
FIG. 9 is a schematic overview depicting an architecture for determining coefficients of the PIM cancellation architecture using a heuristic approach according to embodiments herein.

The forward path models, linear reflective path models and the non-linear model may in some embodiments be determined using a heuristic approach for identifying the de-coupled structure in FIG. 4. This heuristic approach is shown in FIG. 9.

The network device 110, 120 may apply a first signal TxA on the transmitter of branch A and a second signal TxB on the transmitter of branch B. The network node 110, 120 may further search or sweep for optimum values of the coefficients of the filters Fw_filter_A, Fw_filter_B, Filter_A, Filter_B and the non-linear model $\hat{O}n$. The constraint for finding the optimum coefficients is to minimize z1, z2.

Figure 10:
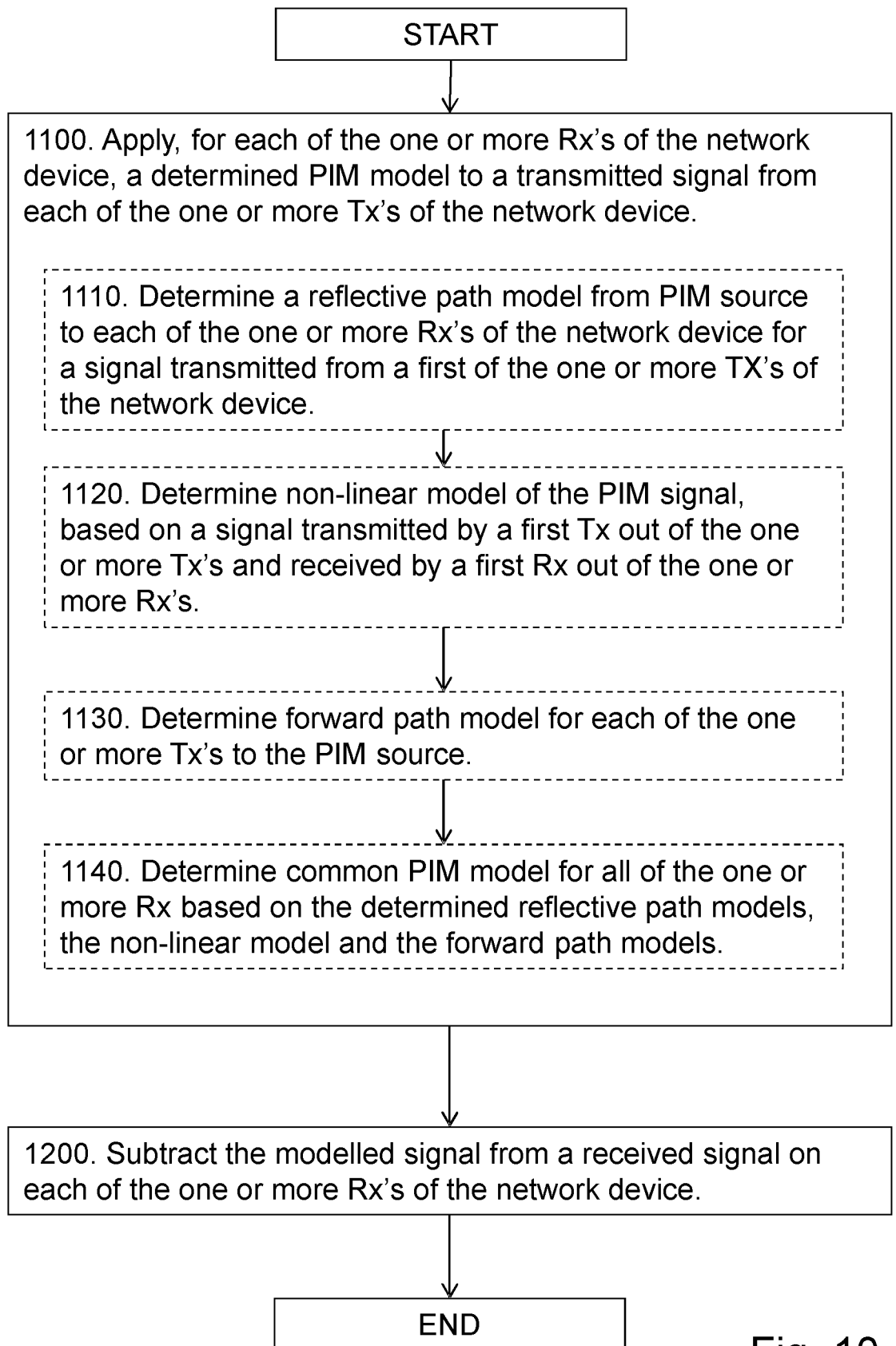
FIG. 10 is a flowchart depicting a method for cancellation of PIM signals performed by a first network device according to a first embodiment herein.

FIG. 10 shows an example method performed by the network device 110, 120 according to embodiments herein, for handling cancellation of the PIM signal from a PIM source in a wireless communications network 100. The network device 110, 120 has access to and controls one or more Tx's and one or more Rx's.

Action 1100: The network device 110, 120 applies, for each of the one or more Rx's of the network device 110, 120, a determined PIM model to a transmitted signal from each of the one or more Tx's of the network device 110, 120, to obtain a modelled signal. The PIM model comprises a linear forward path model for each of the one or more Tx's to the PIM source, a common non-linear model of the PIM signal from the PIM source being applied to a combined signal comprising the signals from each of the one or more Tx's modelled by the linear forward path model, and a linear reflective path model from the PIM source to each of the one or more Rx's of the network device 110, 120 for a received PIM signal.

Action 1200: The network device 110, 120 subtracts the modelled signal from a received signal on each of the one or more Rx's of the network device 110, 120.

Figure 11:
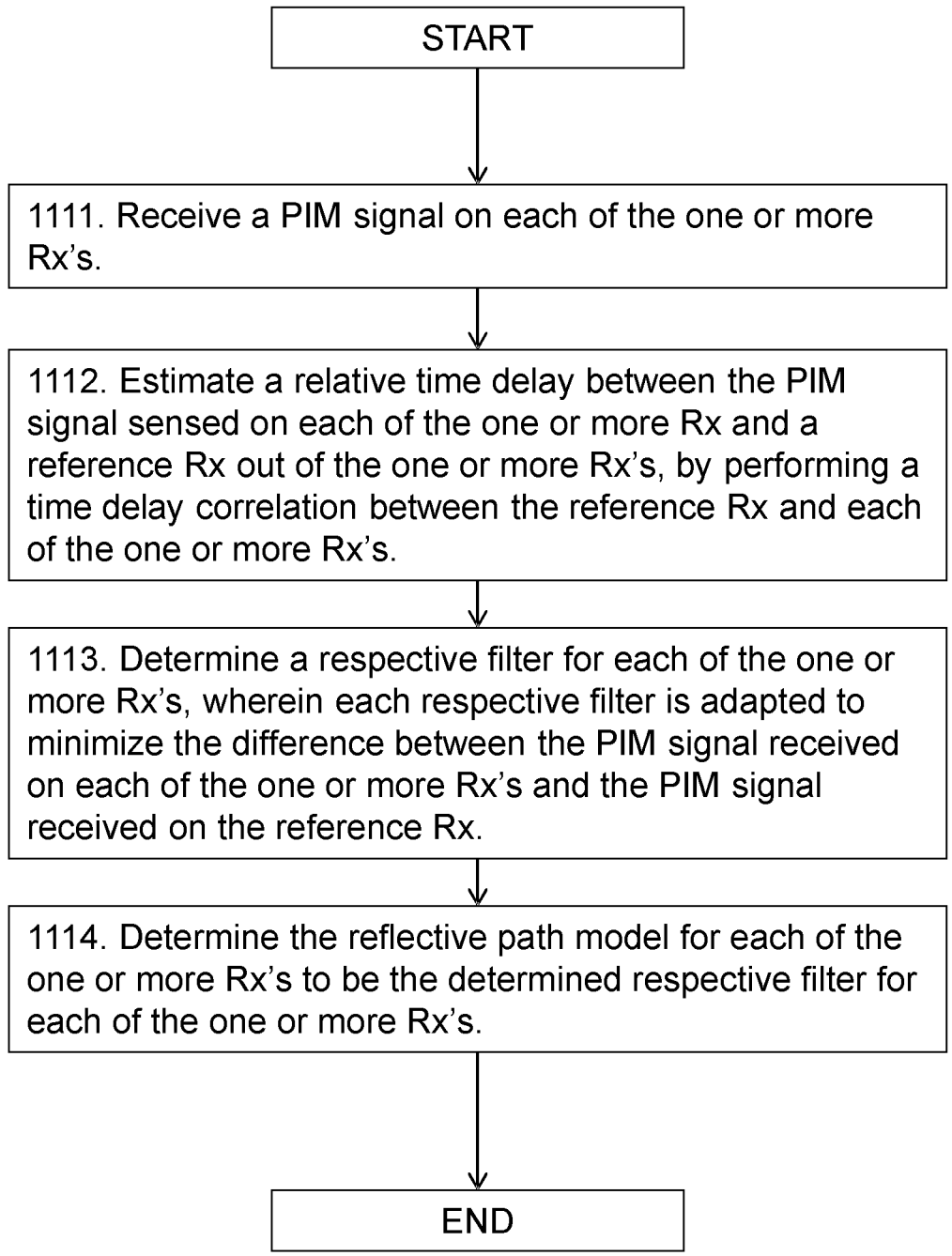
FIG. 11 is a flowchart depicting a method for determining a linear reflective path model for cancellation of PIM signals performed by a first network device according to the first embodiment herein.

In order to determine the PIM model the action 1100 may further comprise the following actions as shown in FIG. 11:

Action 1110: The network device 110, 120 may determine the linear reflective path model from the PIM source to each of the one or more Rx's of the network device 100 for a signal transmitted from a first of the one or more TX's of the network device 100. The network device 110, 120 may determine the linear reflective path model from the PIM source to each of the one or more Rx's is determined by performing the actions 1111-1114 below:

Action 1120: The network device 110, 120 may determine the non-linear model of the PIM source, based on a signal transmitted by a first Tx out of the one or more Tx's, which first Tx may be referred to as a reference Tx, and received by a first Rx out of the one or more Rx's, which first Rx may be referred to as a reference Rx. The network device 110, 120 may determine the non-linear model of the PIM source, based on a signal transmitted by the first Tx out of the one or more Tx's and received by a first of the one or more Rx's, by performing the actions 1121-1124 below:

Action 1130: The network device 110, 120 may determine the linear forward path model for each of the one or more Tx's to the PIM source.

The network device 110, 120 may determine the linear forward path model from each of the one or more Tx's to the PIM source by performing the actions 1131-1133 below:

Action 1140: The network device 110, 120 may determine the PIM model for all of the one or more Rx based on the determined linear reflective path models, the non-linear model and the linear forward path models.

The network device 110, 120 may determine the PIM model for all of the one or more Rx's based on the determined linear reflective path models, the non-linear model and the linear forward path models, by performing the actions 1141-1144 below:

FIG. 11 shows an example method performed by the network device 110, 120 according to embodiments herein, for determining the linear reflective path model according to embodiments herein.

Action 1111: The network device 110, 120 may receive a PIM signal on each of the one or more Rx's. The received PIM signal may be generated by transmitting a signal on each of the Tx's of the network device 110.

Action 1112: The network device 110, 120 may estimate a relative time delay between the PIM signal sensed on each of the one or more Rx and a reference Rx out of the one or more Rx's, by performing a time delay estimation, e.g. through correlation, between the reference Rx and each of the one or more Rx's.

Action 1113: The network device 110, 120 may determine a respective filter for each of the one or more Rx's. Each respective filter is adapted to minimize the difference between the PIM signal received on each of the one or more Rx's and the PIM signal received on the reference Rx. The respective filter may be adapted by taking the estimated relative time delay into account. The estimated relative time delay can either be compensated for prior to filtering the signal received on each Rx or may be handled by means of the filter. However, compensating for the relative time delay prior to the filtering has the benefit that the filter only has to filter out minor deviations.

Action 1114: The network device 110, 120 may determine the linear reflective path model for each of the one or more Rx's to be the determined respective filter for each of the one or more Rx's.

Figure 12:
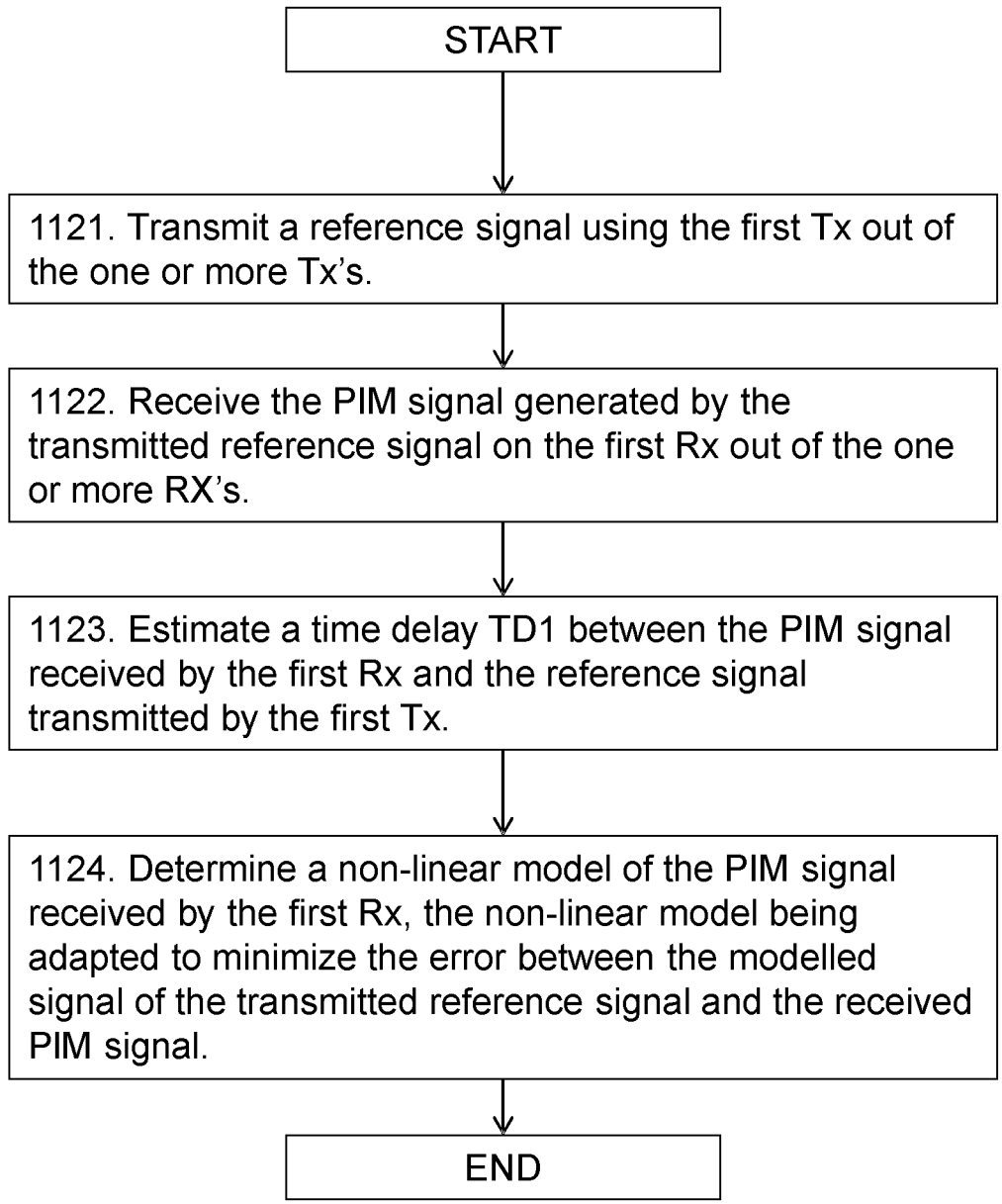
FIG. 12 is a flowchart depicting a method for determining a non-linear model of a PIM source for cancellation of PIM signals performed by a first network device according to the first embodiment herein.

FIG. 12 shows an example method performed by the network device 110, 120 according to embodiments herein, for determining the non-linear model of the PIM source according to embodiments herein.

Action 1121: The network device 110, 120 may transmit a reference signal using the first Tx out of the one or more Tx's.

Action 1122: The network device 110, 120 may receive the PIM signal generated by the transmitted reference signal on the first Rx out of the one or more RX's.

Action 1123: The network device 110, 120 may estimate a time delay TD1 between the PIM signal received by the first Rx and the reference signal transmitted by the first Tx.

Action 1124: The network device 110, 120 may determine a non-linear model of the PIM source based on the PIM signal received by the first Rx, the non-linear model being adapted to minimize the error, such as the residue energy, between modelled signal of the transmitted reference signal and the received PIM signal.

Figure 13:
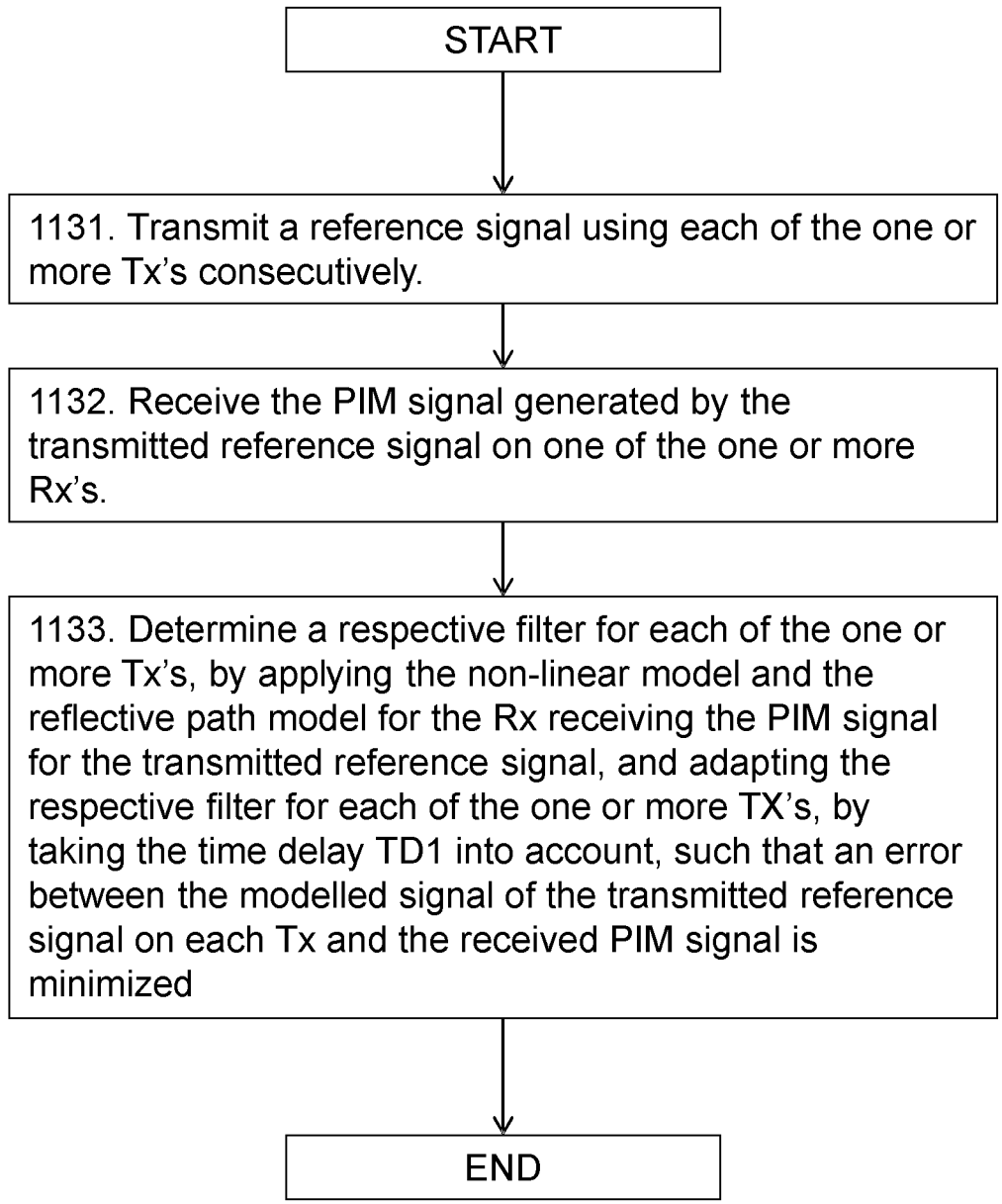
FIG. 13 is a flowchart depicting a method for determining a linear forward path model for cancellation of PIM signals performed by a first network device according to the first embodiment herein.

FIG. 13 shows an example method performed by the network device 110, 120 according to embodiments herein, for determining the linear forward path model for each of the one or more Tx's, according to embodiments herein.

Action 1131: The network device 110, 120 may transmit the reference signal using each of the one or more Tx's consecutively.

Action 1132: The network device 110, 120 may receive the PIM signal generated by the transmitted reference signal on one of the one or more Rx's.

Action 1133: The network device 110, 120 may determine a respective filter for each of the one or more Tx's, which filter may be referred to as a forward filter for each Tx branch X (Fw_filter_X). The Fw_Filter_X for branch A thus corresponds to the Fw_filter_A described with regards to FIG. 7. The respective filter for each of the one or more Tx's may be determined by applying the non-linear model and the linear reflective path model for the Rx receiving the PIM signal to the transmitted reference signal, and adapting the respective filter for each of the one or more TX's, by taking the time delay TD1 into account, such that an error between the modelled signal of the transmitted reference signal and the received PIM signal on each Tx and the Rx receiving the PIM signal is minimized. The error may e.g. be minimized by reducing the residue energy between the transmitted reference signal and the received PIM signal on each Tx and the Rx receiving the PIM signal.

Figure 14:
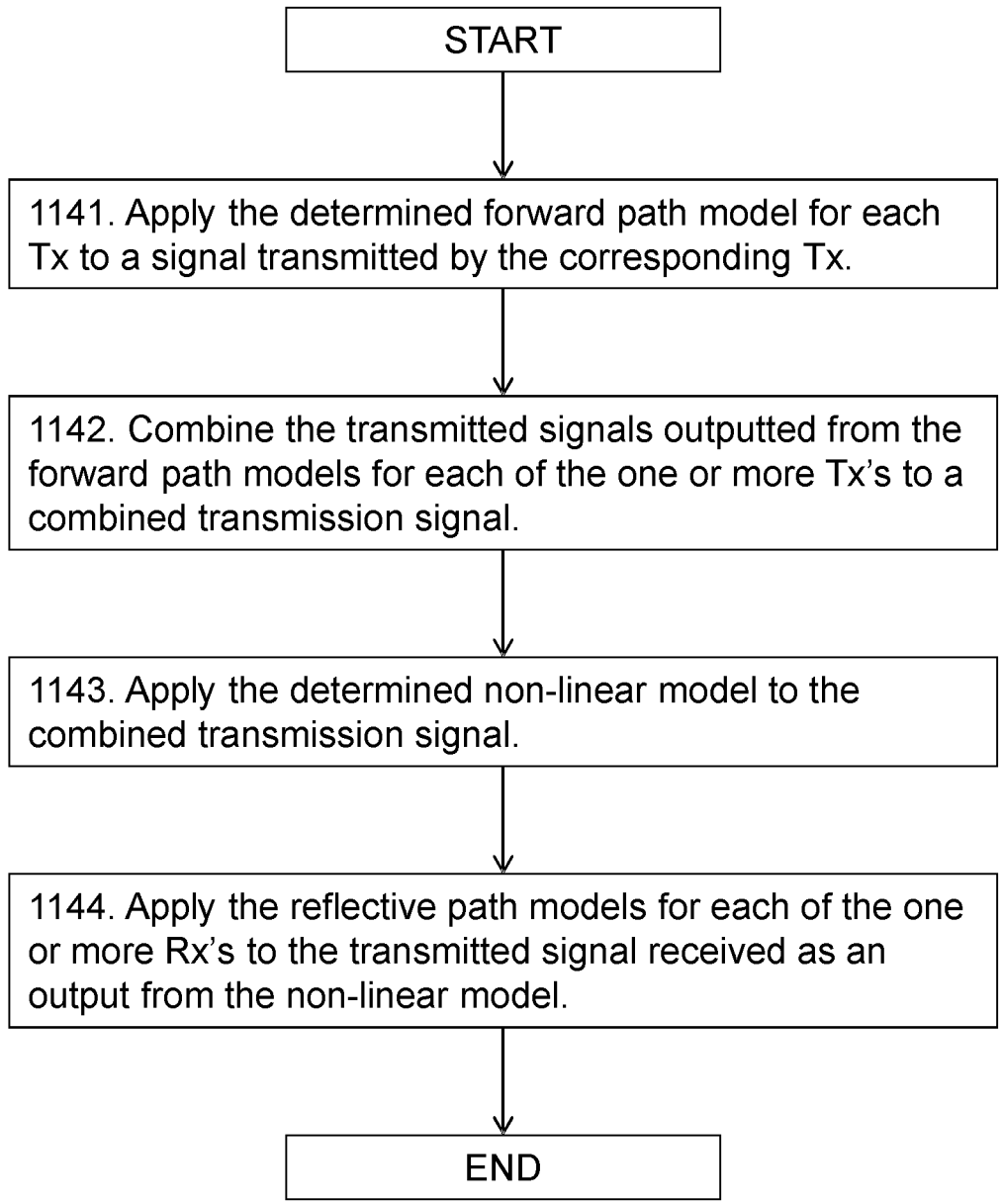
FIG. 14 is a flowchart depicting a method for determining a PIM model for cancellation of PIM signals performed by a first network device according to embodiments herein.

FIG. 14 shows an example method performed by the network device 110, 120 according to embodiments herein, for determining the PIM model for all of the one or more Rx's according to embodiments herein.

Action 1141: The network device 110, 120 may apply the determined linear forward path model for each Tx to a signal transmitted by the corresponding Tx.

Action 1142: The network device 110, 120 may combine the transmitted signals outputted from the linear forward path models for each of the one or more Tx's to a combined transmission signal.

Action 1143: The network device 110, 120 may apply the determined non-linear model to the transmitted signals outputted from the linear forward path models for each of the one or more Tx's to a combined transmission signal. The determined non-linear model may be applied to each of the transmitted signals for each of the one or more Tx's independently, or may be applied to the combined transmission signal from Action 1143.

Action 1144: The network device 110, 120 may apply the linear reflective path models for each of the one or more Rx's to the transmitted signal received as an output from the non-linear model.

Performing the method steps 1141-1144 corresponds to applying the de-coupled PIM-cancellation architecture as shown in FIG. 4.

Figure 15:
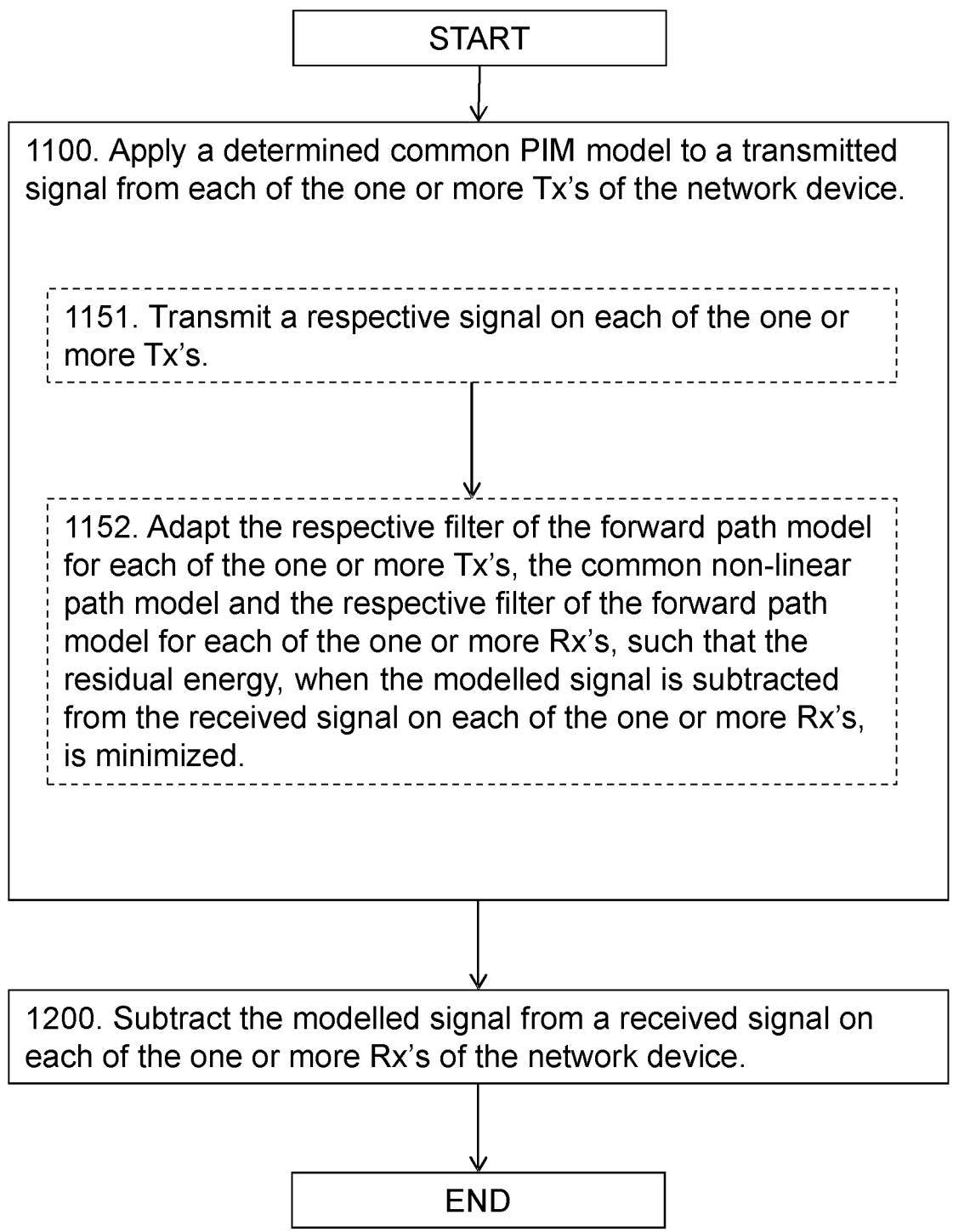
FIG. 15 is a flowchart depicting a method for cancellation of PIM signals performed by a first network device according to a second embodiment herein.

FIG. 15 shows a method performed by the network device 110, wherein the heuristic approach is used to determine the coefficients of the components of the model. The network device 110 may apply the common PIM model described above in relation to FIG. 4, wherein the linear forward path model for each on the one or more Tx's comprises a respective filter, such as the Fw_filter_X, the linear reflective path models for each of the one or more Rx's comprises a respective filter, such as the Filter_X. The network device may determine the respective coefficients for the respective filter of the linear forward path model for each of the one or more Tx's, the common non-linear model O^n and the respective filter of the linear forward path model for each of the one or more Rx's by: The coefficients may e.g. be a phase, a delay, and/or a gain of the model.

Action 1151: The network device 110 may transmit a respective signal on each of the one or more Tx's.

Action 1152: The network device 110 may adapt the respective filter of the linear forward path model for each of the one or more Tx's, the common non-linear path model and the respective filter of the linear forward path model for each of the one or more Rx's, such that the residual energy, when the modelled signal is subtracted from the received signal on each of the one or more Rx's, is minimized.

The actions 1151 and 1152 correspond to the heuristic approach shown in FIG. 10.

To perform the method actions for handling cancellation of the PIM signal from a PIM source in a wireless communications network 100, described above in relation to FIGS. 11 to 16, the network device 110, 120 may comprise the following arrangement as depicted in FIG. 16. The network device 110, 120 has access to and controls one or more Tx's and one or more Rx's.

The network device 110, 120 may comprise a processing unit 1601, such as e.g. one or more processors, and a cancellation unit 1602, a subtracting unit 1603, a determining unit 1604, an estimating unit 1605, a combining unit 1606 as exemplifying hardware units configured to perform the methods described herein. The first network node 150 may further comprise a communication unit 1607 for communicating with other network devices, such as network node 140, 111 or the UE 120. The communication unit 1607 may comprise a transmitting unit 1608 for transmitting information to network devices and a receiving unit 1609 for receiving information from other network devices.

The network device 110, 120 is configured to, e.g. by means of the processing unit 1601 and/or the cancellation unit 1602 being configured to, apply a determined common PIM model to a transmitted signal from each of the one or more Tx's of the network device 110, 120, to obtain a modelled signal, wherein the common PIM model comprises a linear forward path model for each of the one or more Tx's to the PIM source, a common non-linear model of the PIM signal from the PIM source being applied to a combined signal comprising the signals from each of the one or more Tx's modelled by the linear forward path model, and a linear reflective path model from the PIM source to each of the one or more Rx's of the network device 110, 120 for a received PIM signal.

The network device 110, 120 is configured to, e.g. by means of the processing unit 801 and/or the subtracting unit 1603 being configured to, subtract the modelled signal from a received signal on each of the one or more Rx's of the network device 110, 120.

The network device 110, 120 may further be configured to, e.g. by means of the processing unit 1601 and/or the determining unit 1604 being configured to, determine the linear reflective path model from the PIM source to each of the one or more Rx's of the network device 100 for a signal transmitted from a first of the one or more TX's of the network device 100.

The network device 110, 120 may further be configured to, e.g. by means of the processing unit 1601 and/or the determining unit 1604 being configured to, determine the non-linear model of the PIM signal, based on a signal transmitted by a reference Tx out of the one or more Tx's and received by a reference Rx and out of the one or more Rx's of the network device 100.

The network device 110, 120 may further be configured to, e.g. by means of the processing unit 1601 and/or the determining unit 1604 being configured to, determine a linear forward path model for each of the one or more Tx's to the PIM source.

The network device 110, 120 may further be configured to, e.g. by means of the processing unit 1601 and/or the determining unit 1604 being configured to, determine the common PIM model for all of the one or more Rx based on the determined linear reflective path models, the non-linear model and the linear forward path models.

The network device 110, 120 may further be configured to, e.g. by means of the processing unit 1601 and/or the communications unit 1607 and/or the receiving unit 1609 being configured to, receive the PIM signal on each of the one or more Rx's.

The network device 110, 120 may further be configured to, e.g. by means of the processing unit 1601 and/or estimating unit 1605 being configured to, estimate a relative time delay between the PIM signal sensed on each of the one or more Rx and a reference Rx out of the one or more Rx's, by performing a time delay estimation, e.g. through correlation, between the reference Rx and each of the one or more Rx's, The network device 110, 120 may further be configured to, e.g. by means of the processing unit 1601 and/or the determining unit 1604 being configured to, determine a respective filter for each of the one or more Rx's, wherein the respective filter is adapted to minimize the difference between the PIM signal received on each of the one or more Rx's and the PIM signal received on the reference Rx, taking the estimated time delay into account.

The network device 110, 120 may further be configured to, e.g. by means of the processing unit 1601 and/or the determining unit 1604 being configured to, determine the linear reflective path model for each of the one or more Rx's to be the determined respective filter for each of the one or more Rx's.

The network device 110, 120 may further be configured to, e.g. by means of the processing unit 1601 and/or the communications unit 1607 and/or the transmitting unit 1608 being configured to, transmit a reference signal using the first Tx out of the one or more Tx's.

The network device 110, 120 may further be configured to, e.g. by means of the processing unit 1601 and/or the communications unit 1607 and/or the receiving unit 1609 being configured to, receive the PIM signal generated by the transmitted reference signal on the first Rx out of the one or more Rx's, The network device 110, 120 may further be configured to, e.g. by means of the processing unit 1601 and/or estimating unit 1605 being configured to, estimate a time delay TD1 between the PIM signal received by the first Rx and the reference signal transmitted by the first Tx, The network device 110, 120 may further be configured to, e.g. by means of the processing unit 1601 and/or the determining unit 1604 being configured to, determine a non-linear model of the PIM signal received by the first Rx, the non-linear model being adapted to minimize the error, such as the residue energy, between the transmitted reference signal and the received PIM signal.

The network device 110, 120 may further be configured to, e.g. by means of the processing unit 1601 and/or the communications unit 1607 and/or the transmitting unit 1608 being configured to, transmit the reference signal using each of the one or more Tx's consecutively.

The network device 110, 120 may further be configured to, e.g. by means of the processing unit 1601 and/or the communications unit 1607 and/or the receiving unit 1609 being configured to, receive the PIM signal generated by the transmitted reference signal on one of the one or more Rx's.

The network device 110, 120 may further be configured to, e.g. by means of the processing unit 1601 and/or the determining unit 1604 being configured to, determine a respective filter for each of the one or more Tx's, by applying the non-linear model and the linear reflective path model for the Rx receiving the PIM signal to the transmitted reference signal, and adapting the respective filter for each of the one or more TX's, by taking the time delay TD1 into account, such that an error, such as a residue energy, between the transmitted reference signal and the received PIM signal on each Tx and the Rx receiving the PIM signal is minimized.

The network device 110, 120 is configured to, e.g. by means of the processing unit 1601 and/or the cancellation unit 1602 being configured to, apply the determined linear forward path model for each Tx to a signal transmitted by the corresponding Tx.

The network device 110, 120 may further be configured to, e.g. by means of the processing unit 1601 and/or combining unit 1606 being configured to, combine the transmitted signals outputted from the linear forward path models for each of the one or more Tx's to a combined transmission signal.

The network device 110, 120 is configured to, e.g. by means of the processing unit 1601 and/or the cancellation unit 1602 being configured to, apply the determined non-linear model to the combined transmission signal.

The network device 110, 120 is configured to, e.g. by means of the processing unit 1601 and/or the cancellation unit 1602 being configured to, apply the linear reflective path models for each of the one or more Rx's to the transmitted signal outputted from the non-linear model.

The linear forward path model for each on the one or more Tx's may comprise a respective filter, the linear reflective path models for each of the one or more Rx's may comprises a respective filter, and the network device 110, 120 may be configured to determine the respective filter of the linear forward path model for each of the one or more Tx's, the common non-linear path model and the respective filter of the linear forward path model for each of the one or more Rx's by being configured to, e.g. by means of the processing unit 1601 and/or the communications unit 1607 and/or the transmitting unit 1608 being configured to, transmit a respective signal on each of the one or more Tx's, and being configured to, e.g. by means of the processing unit 1601 and/or the cancellation unit 1602 and/or the determining unit 1604 being configured to, adapt the respective filter of the linear forward path model for each of the one or more Tx's, the common non-linear path model and the respective filter of the linear forward path model for each of the one or more Rx's, such that the residual energy, when the modelled signal is subtracted from the received signal on each of the one or more Rx's, is minimized.

The network device 110, 120 may further comprise a memory 1610. The memory 1610 comprises one or more memory units to be used to store data on, such as system information, configurations and/or applications to perform the methods disclosed herein when being executed, and similar.

Those skilled in the art will also appreciate that the cancellation unit 1602, the subtracting unit 1603, the determining unit 1604, the estimating unit 1605 and/or the combining unit 1606 described above may refer to a combination of analog and digital circuits, and/or one or more processors configured with software and/or firmware, e.g. stored in the memory 1610, that when executed by the one or more processors such as the processing unit 1601 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 16:
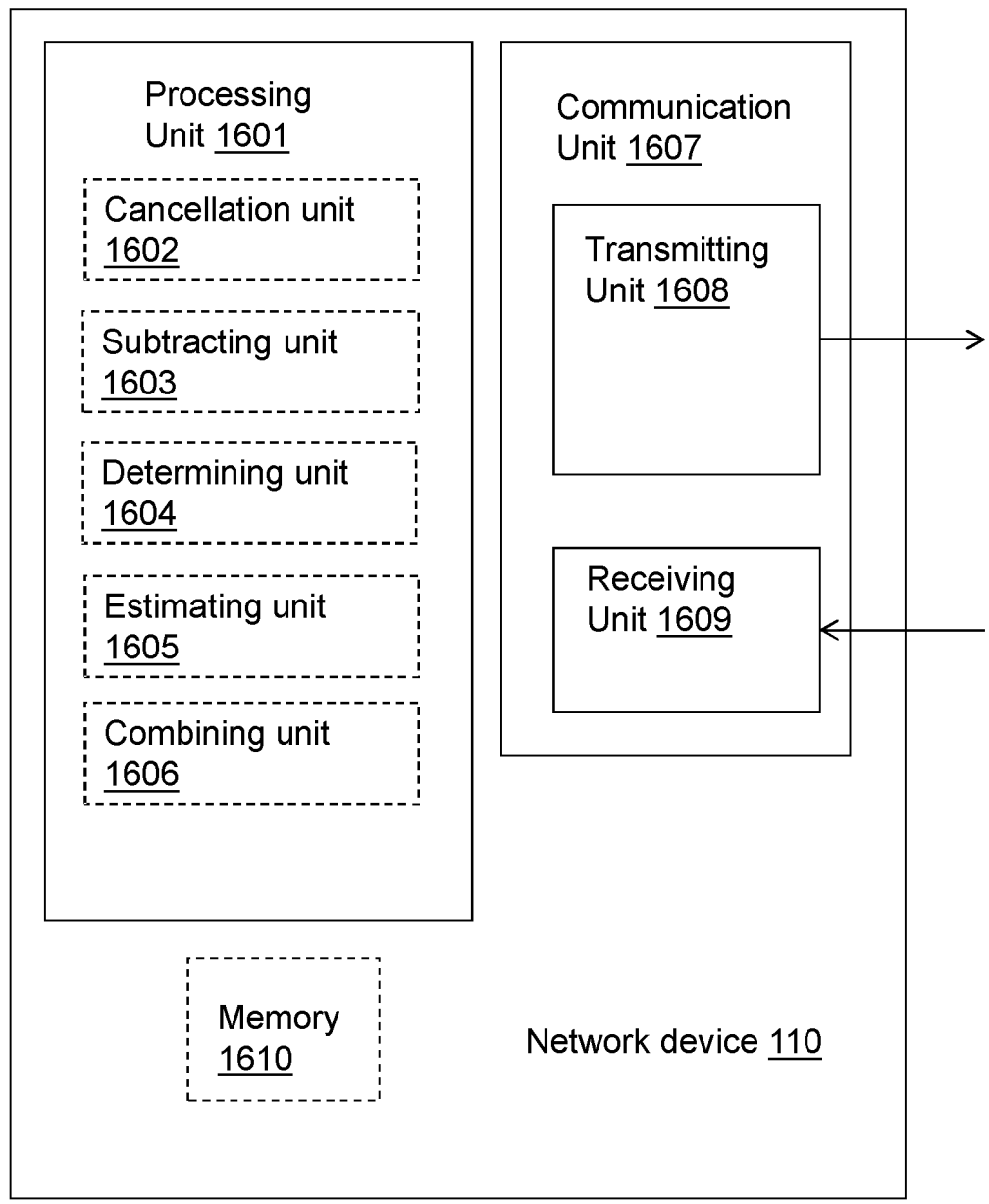
FIG. 16 is a schematic block diagram illustrating some first embodiments of the network device.
Figure 16:
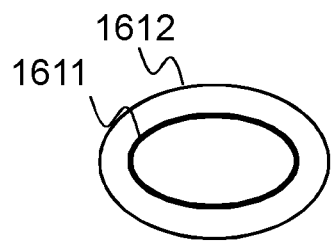

The embodiments herein performed by the network device 110, 120 may be implemented through a respective processor or one or more processors, such as the processor 1601 of a processing circuitry in the network device 110, 120 depicted in FIG. 16, together with respective computer program code for performing the functions and actions of the embodiments herein. The program code mentioned above may also be provided as a computer program product, for instance in the form of a data carrier carrying computer program code for performing the embodiments herein when being loaded into the network device 110, 120. One such carrier may be in the form of a CD ROM disc. It is however feasible with other data carriers such as a memory stick. The computer program code may furthermore be provided as pure program code on a server and downloaded to the network device 110, 120.

Figure 17:
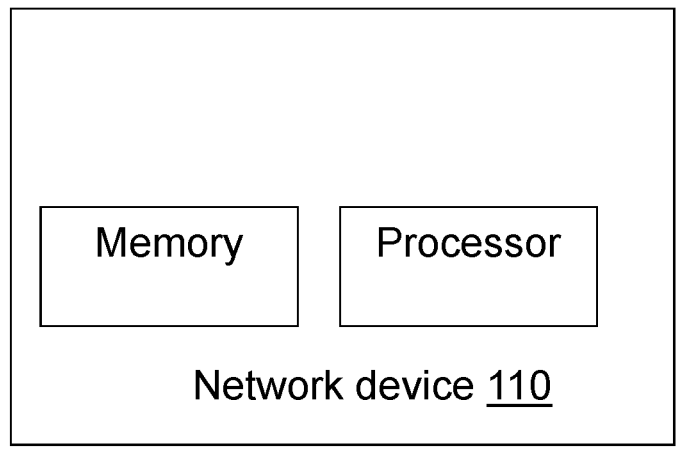
FIG. 17 is a schematic block diagram illustrating some second embodiments of the network device.
Figure 17:
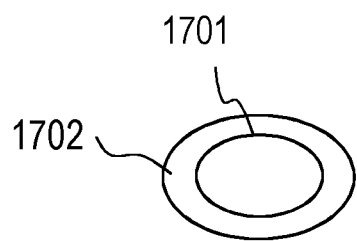

The embodiments herein for handling cancellation of the PIM signal from a PIM source in the wireless communications network 100, according to the embodiments described herein, may be implemented through a respective processor or one or more processors of a processing circuitry in the network device 110, 120 as depicted in FIG. 17, which processing circuitry is configured to perform the method actions according to FIGS. 10 to 15 and the embodiments described above for the network device 110, 120.

The embodiments may be performed by the processor together with respective computer program code for performing the functions and actions of the embodiments herein. The program code mentioned above may also be provided as a computer program product, for instance in the form of a data carrier carrying computer program code for performing the embodiments herein when being loaded into the network device 110, 120. One such carrier may be in the form of a CD ROM disc. It is however feasible with other data carriers such as e.g. a memory stick. The computer program code may furthermore be provided as pure program code on a server and downloaded to the network device 110, 120.

The network device 110, 120 may further comprise a memory. The memory may comprise one or more memory units to be used to store data on, such as the numbers determined to be related to a non-legitimate device, software, patches, system information (SI), configurations, diagnostic data, performance data and/or applications to perform the methods disclosed herein when being executed, and similar.

The method according to the embodiments described herein for the network device 110, 120 may be implemented by means of e.g. a computer program product 1611, 1701 or a computer program, comprising instructions, i.e., software code portions, which, when executed on at least one processor, cause at least one processor to carry out the actions described herein, as performed by the network device 110, 120. The computer program product 1611, 1701 may be stored on a computer-readable storage medium 1612, 1702, e.g. a disc or similar. The computer-readable storage medium 1612, 1702, having stored thereon the computer program, may comprise instructions which, when executed on at least one processor, cause the at least one processor to carry out the actions described herein, as performed by the network device 110, 120. In some embodiments, the computer-readable storage medium may be a non-transitory computer-readable storage medium. The computer program may also be comprised on a carrier, wherein the carrier is one of an electronic signal, optical signal, radio signal, or a computer readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of the first network device 110, 120.

The network device 110, 120 described in the embodiments herein may also be implemented in a cloud. Although the method actions performed by the network device 110, 120 herein are discussed in the context of a network node, such as e.g. the radio network node 110, the method may also be performed by a core network node or a distributed node comprised in a first cloud, such as e.g. a server and/or a data center. The method actions may e.g. be performed by a logical function, which may be a centralized service hosted on the network device or the distributed node.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method, performed by a network device, for handling cancellation of a Passive Intermodulation, PIM, signal from a PIM source in a wireless communications network, wherein the network device has access to and controls one or more transmitter, Tx, and one or more receiver, Rx, wherein the method comprises:
   applying, for each of the one or more Rx's of the network device, a determined PIM model to a transmitted signal from each of the one or more Tx's of the network device, to obtain a modelled signal, wherein the PIM model comprises:
      i. a linear forward path model for each of the one or more Tx's to the PIM source,
      ii. a common non-linear model of the PIM source being applied to the signals from each of the one or more Tx's modelled by the linear forward path model, wherein the common non-linear model is based on a comparison between a first signal transmitted by a reference Tx out of the one or more Tx's and a second signal received by a reference Rx and out of the one or more Rx's of the network device, and
      iii. a linear reflective path model from the PIM source to each of the one or more Rx's of the network device for a received PIM signal, wherein the linear reflective path model is determined based on a signal transmitted by the reference Tx out of the one or more Tx's, wherein the linear reflective path model is further determined based on:
         receiving the PIM signal on each of the one or more Rx's,
         estimating a relative time delay between the PIM signal received on each of the one or more Rx and a reference Rx out of the one or more Rx's, by performing a time delay estimation between the reference Rx and each of the one or more Rx's,
         determining a respective filter for each of the one or more Rx's, wherein the respective filter is adapted to minimize the difference between the PIM signal received on each of the one or more Rx's and the PIM signal received on the reference Rx, taking the estimated time delay into account, and
         determining the linear reflective path model for each of the one or more Rx's to be the determined respective filter for each of the one or more Rx's, and
   subtracting the modelled signal from a received signal on each of the one or more Rx's of the network device.

2. The method according to claim 1, wherein the method comprises:
   determining the linear forward path model for each of the one or more Tx's to the PIM source, and
   determining the PIM model for all of the one or more Rx based on the determined linear reflective path models, the non-linear model and the forward path models.

3. The method according to claim 2, wherein the step of determining the non-linear model of the PIM signal, based on a signal transmitted by the first Tx out of the one or more Tx's and received by a first of the one or more Rx's comprises:
   transmitting a reference signal using the first Tx out of the one or more Tx's,
   receiving the PIM signal generated by the transmitted reference signal on the first Rx out of the one or more RX's,
   estimating a time delay TD1 between the PIM signal received by the first Rx and the reference signal transmitted by the first Tx, and
   determining a non-linear model of the PIM signal received by the first Rx, the non-linear model being adapted to minimize an error between the transmitted reference signal and the received PIM signal.

4. The method according to claim 1, wherein the step of determining the linear forward path model from each of the one or more Tx's to the PIM source comprises:
   transmitting the reference signal using each of the one or more Tx's consecutively,
   receiving the PIM signal generated by the transmitted reference signal on one of the one or more Rx's, and
   determining a respective filter for each of the one or more Tx's, by applying the non-linear model and the model for the Rx receiving the PIM signal to the transmitted reference signal, and adapting the respective filter for each of the one or more TX's, by taking the time delay TD1 into account, such that an error between the transmitted reference signal on each Tx and the received PIM signal is minimized.

5. A non-transitory computer-readable storage medium having stored thereon a computer program comprising instructions which, when executed by a computer, cause the computer to perform the method of claim 1.

6. A network device, for handling cancellation of a Passive Intermodulation, PIM, signal from a PIM source in a wireless communications network, wherein the network device has access to and controls one or more transmitter, Tx, and one or more receiver, Rx, the network device being configured to:
   apply, for each of the one or more Rx's of the network device, a determined PIM model to a transmitted signal from each of the one or more Tx's of the network device, to obtain a modelled signal, wherein the PIM model comprises:
      i. a linear forward path model for each of the one or more Tx's to the PIM source,
      ii. a common non-linear model of the PIM signal from the PIM source being applied to the signals from each of the one or more Tx's modelled by the linear forward path model, wherein the common non-linear model is based on a comparison between a first signal transmitted by a reference Tx out of the one or more Tx's and a second signal received by a reference Rx and out of the one or more Rx's of the network device, and
      iii. a linear reflective path model from the PIM source to each of the one or more Rx's of the network device for a received PIM signal, wherein the linear reflective path model is determined based on a signal transmitted by the reference Tx out of the one or more Tx's, wherein the linear reflective path model is further determined based on:

receiving the PIM signal on each of the one or more Rx's, estimating a relative time delay between the PIM signal received on each of the one or more Rx and a reference Rx out of the one or more Rx's, by performing a time delay estimation between the reference Rx and each of the one or more Rx's, determining a respective filter for each of the one or more Rx's, wherein the respective filter is adapted to minimize the difference between the PIM signal received on each of the one or more Rx's and the PIM signal received on the reference Rx, taking the estimated time delay into account, and determining the linear reflective path model for each of the one or more Rx's to be the determined respective filter for each of the one or more Rx's, and subtract the modelled signal from a received signal on each of the one or more Rx's of the network device.

7. The network device according to claim 6, wherein the network device is further configured to:

determine the linear forward path model for each of the one or more Tx's to the PIM source, and determine the common PIM model for all of the one or more Rx based on the determined linear reflective path models, the non-linear model and the linear forward path models.

8. The network device according to claim 7, wherein the network device, in order to determine the non-linear model of the PIM signal, based on a signal transmitted by the first Tx out of the one or more Tx's and received by a first of the one or more Rx's, is further configured to:

transmit a reference signal using the first Tx out of the one or more Tx's, receive the PIM signal generated by the transmitted reference signal on the first Rx out of the one or more Rx's, estimate a time delay TD1 between the PIM signal received by the first Rx and the reference signal transmitted by the first Tx, and determine a non-linear model of the PIM signal received by the first Rx, the non-linear model being adapted to minimize an error between the transmitted reference signal and the received PIM signal.

9. The network device according to claim 7, wherein the network device, in order to determine the linear forward path model from each of the one or more Tx's to the PIM source, is further configured to:

transmit the reference signal using each of the one or more Tx's consecutively, receive the PIM signal generated by the transmitted reference signal on one of the one or more Rx's, and determine a respective filter for each of the one or more Tx's, by applying the non-linear model and the linear reflective path model for the Rx receiving the PIM signal to the transmitted reference signal, and adapting the respective filter for each of the one or more TX's, by taking the time delay TD1 into account, such that an error between the transmitted reference signal and the received PIM signal on each Tx and the Rx receiving the PIM signal is minimized.

10. The network device according to claim 6, wherein the network device, in order to determine the common PIM model for all of the one or more Rx's based on the determined linear reflective path models, the non-linear model and the linear forward path models, is further configured to:

apply the determined linear forward path model for each Tx to a signal transmitted by the corresponding Tx, apply the determined non-linear model to the transmitted signals outputted from the linear forward path models for each of the one or more Tx's, and apply the linear reflective path models for each of the one or more Rx's to the transmitted signal outputted from the non-linear model.

11. The network device according to claim 10, wherein the network device is further configured to:

combine the transmitted signals outputted from the linear forward path models for each of the one or more Tx's to a combined transmission signal prior to applying the determined non-linear model to the signal.

12. The network device according to claim 6, wherein the linear forward path model for each on the one or more Tx's comprises a respective filter, the linear reflective path models for each of the one or more Rx's comprises a respective filter, and wherein the network device is configured to determine the respective filter of the linear forward path model for each of the one or more Tx's, the common non-linear path model and the respective filter of the linear forward path model for each of the one or more Rx's by being configured to:

transmit a respective signal on each of the one or more Tx's, and adapt the respective filter of the linear forward path model for each of the one or more Tx's, the common non-linear path model and the respective filter of the linear forward path model for each of the one or more Rx's, such that the residual energy, when the modelled signal is subtracted from the received signal on each of the one or more Rx's, is minimized.

* * * * *